US011897733B2

(12) United States Patent
Bedgood et al.

(10) Patent No.: US 11,897,733 B2
(45) Date of Patent: Feb. 13, 2024

(54) SENSING DEVICE FOR A CRANE

(71) Applicants: Thomas Bedgood, Mackay (AU); Dean Dobson, Mackay (AU); Alex Kuiper, Mackay (AU)

(72) Inventors: Thomas Bedgood, Mackay (AU); Dean Dobson, Mackay (AU); Alex Kuiper, Mackay (AU)

( * ) Notice: Subject to any disclaimer, the term of this patent is extended or adjusted under 35 U.S.C. 154(b) by 760 days.

(21) Appl. No.: 17/052,763

(22) PCT Filed: May 1, 2019

(86) PCT No.: PCT/AU2019/050395
§ 371 (c)(1),
(2) Date: Nov. 3, 2020

(87) PCT Pub. No.: WO2019/210362
PCT Pub. Date: Nov. 7, 2019

(65) Prior Publication Data

US 2021/0371250 A1 Dec. 2, 2021

(30) Foreign Application Priority Data

May 4, 2018 (AU) ................................ 2018901520

(51) Int. Cl.
*B66C 1/40* (2006.01)
*B66C 13/46* (2006.01)
*B66C 15/06* (2006.01)

(52) U.S. Cl.
CPC ................ *B66C 1/40* (2013.01); *B66C 13/46* (2013.01); *B66C 15/065* (2013.01)

(58) Field of Classification Search
CPC ......... B66C 1/40; B66C 13/46; B66C 15/065; B66C 23/905; B66C 23/38; B66C 23/701; B66C 23/828
See application file for complete search history.

(56) References Cited

U.S. PATENT DOCUMENTS

| | | | | |
|---|---|---|---|---|
| 9,120,653 | B2 * | 9/2015 | Bohnacker .............. | B66C 13/46 |
| 9,446,934 | B2 * | 9/2016 | Lin ......................... | B66C 13/46 |
| 9,856,118 | B1 * | 1/2018 | Lin ......................... | B66C 13/46 |
| 2012/0255188 | A1 | 10/2012 | Tang et al. | |
| 2015/0353329 | A1 * | 12/2015 | Lin ......................... | B66C 13/16 33/333 |

FOREIGN PATENT DOCUMENTS

| | | |
|---|---|---|
| CN | 207090817 U | 3/2018 |
| WO | 2015137674 A1 | 9/2015 |

OTHER PUBLICATIONS

International Preliminary Report on Patent Ability for International Patent No. PCT/AU2019/050395, dated Mar. 23, 2020.

* cited by examiner

*Primary Examiner* — Stephen A Vu
(74) *Attorney, Agent, or Firm* — WOMBLE BOND DICKINSON (US) LLP

(57) ABSTRACT

A sensing device for a crane detecting unsafe operating conditions includes an inertial measurement unit for measuring pitch and yaw of a hook of the crane attached to a load. The inertial measurement unit is adapted to measure deviation of the hook of the crane from a plumb position and activate an alert element if the deviation of the hook exceeds a predetermined limit.

20 Claims, 3 Drawing Sheets

SENSING DEVICE FOR A CRANE

This application is a U.S. national stage application of the PCT International Application No. PCT/AU2019/050395 filed on May 1, 2019, which claims the benefit of foreign priority of Australian patent application No. 2018901520 filed on May 4, 2018, the contents all of which are incorporated herein by reference.

FIELD OF THE INVENTION

The invention relates to a sensing device and method for assisting crane riggers that is particularly useful for detecting unsafe, out of plumb conditions of a lifting hook of a luffing type crane.

BACKGROUND

Reference to background art herein is not to be construed as an admission that such art constitutes common general knowledge.

Warning devices to signal or to correct an unsafe lifting condition in the use of cranes are known.

One such dangerous condition involves lifting, when the crane boom is misaligned vertically with the radius of the load whereupon the crane and associated components would become overloaded, or more critically, the resulting swinging action of the load could cause the crane to be overturned.

Crane operators with many years of experiences are generally proficient in visually identifying an overloaded crane boom. However, after attachment of the lift cable hook to the load point and slack is taken up in the lift cable, the lift cable can remain out of plumb by several degrees. Such a situation can lead to an unsafe operating condition with the result that when the load is lifted, it suddenly swings, causing equipment damage or injury to people in the surrounding area.

The difficulty of accurately identifying problems with the crane boom is increased when the boom is particularly long and/or elevated to a high angle and can be further complicated when a prevailing wind is present.

Furthermore, in some situations, the load to be lifted is out of view by a crane operator and the operator must rely solely upon instructions issued by a third party, such as a Rigger or Dogman.

OBJECT OF THE INVENTION

It is an aim of this invention to provide a sensing device for assisting crane riggers which overcomes or ameliorates one or more of the disadvantages or problems described above, or which at least provides a useful commercial alternative.

Other preferred objects of the present invention will become apparent from the following description.

SUMMARY OF THE INVENTION

In one form, although it need not be the only or indeed the broadest form, the invention resides in a sensing device for a crane for detecting unsafe operating conditions comprising:

- an inertial measurement unit for measuring pitch and yaw of a hook of a crane attached to a load,
- wherein the inertial measurement unit is adapted to measure deviation of the hook of the crane from a plumb position and activate an alert element if the deviation of the hook exceeds a predetermined limit.

Preferably, the sensing device is adapted to activate an alert element if the deviation of the hook is within a predefined range.

Preferably, the sensing device is adapted to indicate a plumb or an out of plumb lift cable attached to a load.

Preferably, the inertial measurement unit comprises an electronic gyroscope adapted to measure orientation of the hook and obtain orientation data. Preferably, the inertial measurement unit further comprises an accelerometer adapted to measure orientation of the hook and obtain orientation data. Preferably, the gyroscope and the accelerometer are adapted to measure deviation from vertical pitch of the hook.

Preferably, the inertial measurement unit comprises a magnetometer adapted to measure changes of the hook relative to magnetic north. Preferably, the magnetometer is adapted to measure yaw of the hook.

Preferably, the sensing device further comprises a microcontroller. Preferably, the microcontroller is arranged to calculate a compensation factor for the magnetometer. Preferably, the microcontroller is arranged to calculate the compensation factor to compensate for heavy iron present in the hook.

Preferably, the microcontroller is arranged to combine orientation data measured by the accelerometer and the gyroscope with a statistical estimation filter. Preferably, the statistical estimation filter comprises a Kalman filter. Suitably, the microcontroller is arranged to use the combination of the orientation data with the statistical estimation filter to determine deviation from the plumb position.

Preferably, the sensing device comprises a housing. Preferably, the housing is waterproof. Preferably, the inertial measurement unit is located within the housing.

Preferably, the sensing device is removably attached to a collar of the hook.

Preferably, the inertial measurement unit is adapted to measure the deviation of the hook in degrees.

Preferably, the sensing device is connected to a graphical display device. Preferably, the sensing device is wirelessly connected to the graphical display device.

Preferably, the sensing device is arranged to operate the graphical display device to display a visual indication of the hook in relation to the plumb position on the graphical display device.

Preferably, the sensing device is connected to a crane sensor bus. Preferably, the sensing device is arranged to read one or more of a load weight, a boom radius, a boom length and a total weight from the crane sensor bus.

Preferably, the alert element is in the form of an audible signal generator or a visual signal generator, such as a flashing light or a pop-up on a graphic display.

In another form, the invention resides in a method for detecting an unsafe operating lifting condition for a crane, the method comprising the steps of:

- determining a deviation of a hook from a plumb position using an inertial measurement unit attached to a crane; and
- activating an alert element if the hook is not in a plumb position.

Preferably, the method comprises the further step of determining if the deviation of the hook from the plumb position is less than or greater than a predetermined limit.

Preferably, the step of determining a deviation of the hook comprises calculating an angle of pitch of the hook using the inertial measurement unit. Preferably, the step of determining a deviation further comprises calculating the angle of yaw of the hook using the inertial measurement unit.

Preferably, if the deviation of the hook is greater than a predetermined limit, the method comprises the further step of operating an alert element to indicate that the deviation of the hook is greater than the predetermined limit. Preferably, the alert element indicates that the operating condition of the crane is unsafe.

Preferably, the method comprises the further step of determining if the hook is in a plumb or out of plumb position.

Preferably, if the deviation of the hook is less than the predetermined limit, the method comprises the further step of operating an alert element to indicate that the deviation of the hook is less than the predetermined limit. Preferably, the alert element indicates that the operating condition of the crane is safe or within the predetermined limit.

Preferably, the alert element comprises a display device of an operator of the crane and/or a rigger.

Preferably, the step of calculating the angle of the pitch plane comprises comparing data obtained from a gyroscope and an accelerometer with a gravity vector. Preferably, the data from the gyroscope comprises the angular momentum of the hook. Preferably, a statistical estimation filter is applied to the data obtained from the gyroscope and the accelerometer.

Preferably, the method further comprises the step of calculating yaw of the hook. Preferably, yaw of the hook is calculated by a magnetometer. Preferably, the magnetometer compensates for any twist in the cables attached to the hook.

Preferably, the alert element is in the form of an audible signal generator or a visual signal generator, such as a flashing light or graphic display element.

Preferably, the alert element is received by a graphical display device. Preferably, the alert element is transmitted to and received by the graphical display device wirelessly over a Low-Power Wide-Area Network (LPWAN) for long range communication.

In another form, the invention resides in a system for determining deviation of a hook from a plumb position, the system comprising:

- a sensing device having an inertial measurement unit and a microcontroller;
- a crane having a hook, wherein the sensing device is attached to the hook;
- the sensing device configured to:
  - calculate an angle of a pitch plane by comparing angular momentum of the hook with a gravity vector; and
  - determine deviation of the hook from vertical.

Further features and advantages of the present invention will become apparent from the following detailed description.

BRIEF DESCRIPTION OF THE DRAWINGS

By way of example only, preferred embodiments of the invention will be described more fully hereinafter with reference to the accompanying drawings, which are as follows.

DETAILED DESCRIPTION OF THE PROFFERED EMBODIMENTS

Figure 1:
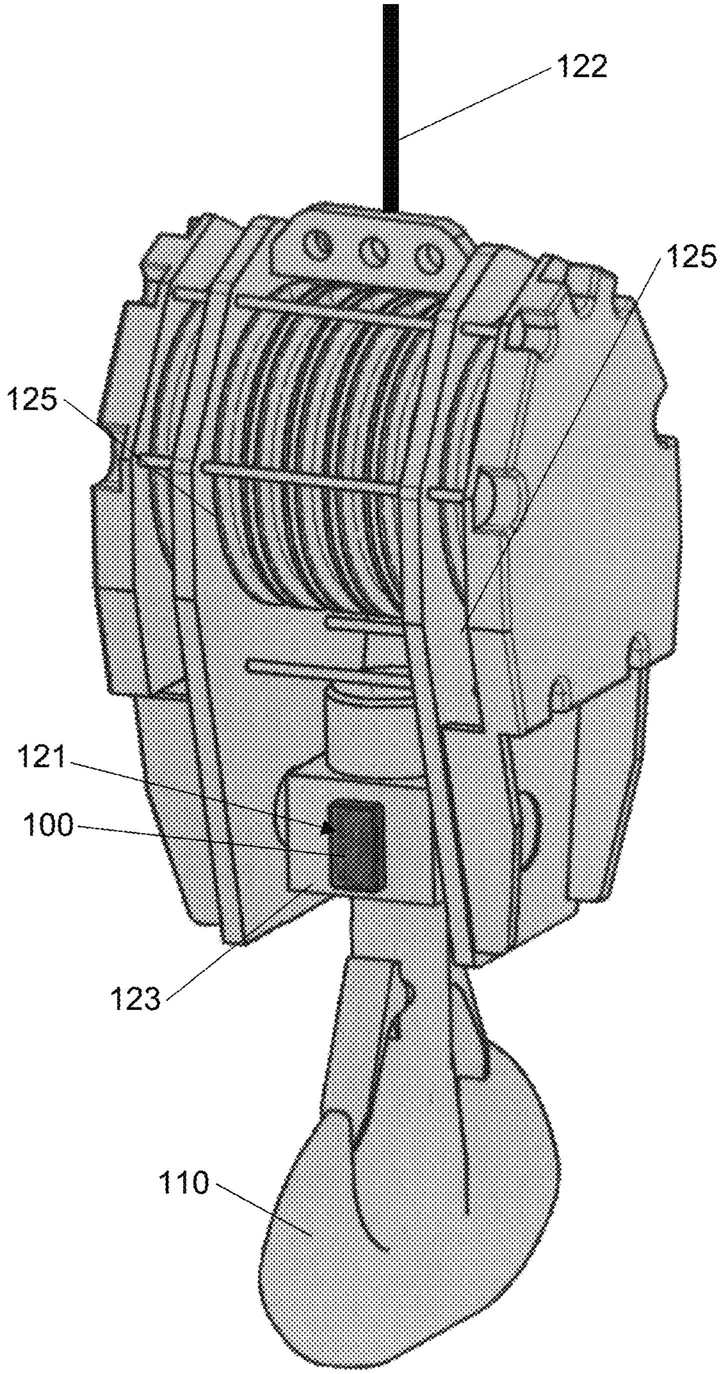
FIG. 1 illustrates a sensing device according to an embodiment of the present invention attached a to a crane.
Figure 2:
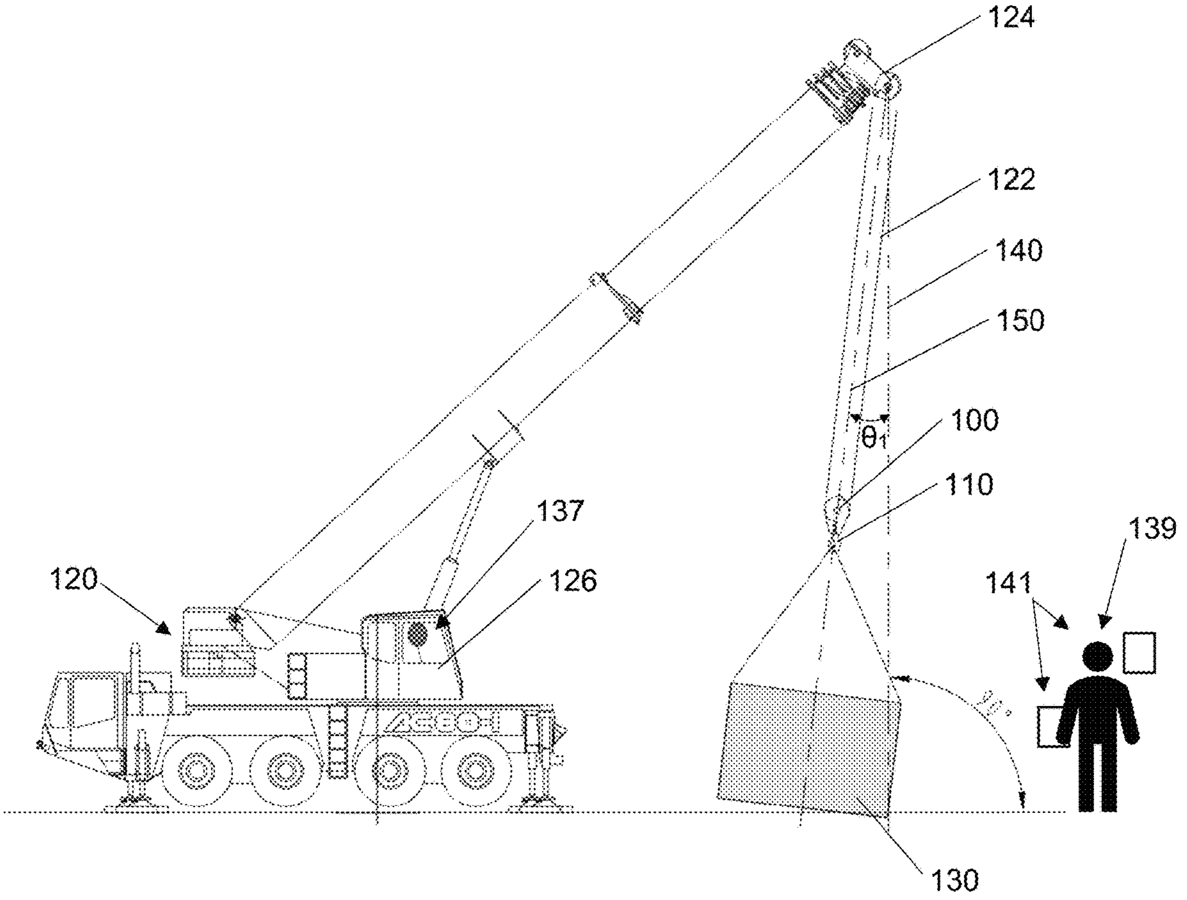
FIG. 2 illustrates the sensing device of FIG. 1 attached to a lifting hook of a crane preparing to lift a load.
Figure 3:
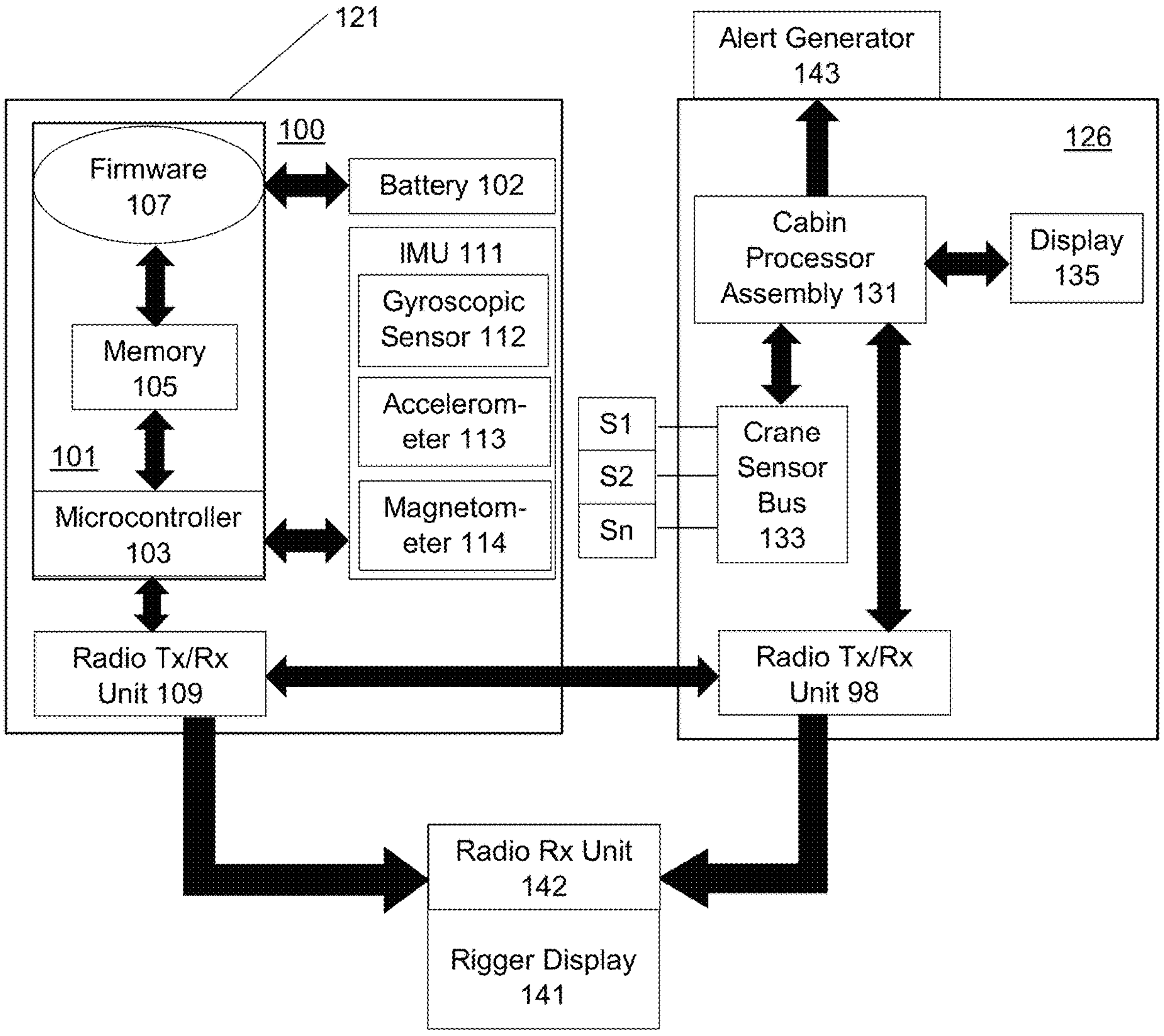
FIG. 3 illustrates a schematic diagram of the sensing device of FIG. 1, the crane cabin and the rigger display device.

FIGS. 1, 2 and 3 illustrate a crane hook sensing device 100 for detecting an unsafe, out of plumb, lifting hook 110 of a luffing type crane 120 (shown in FIG. 2).

The crane hook sensing device 100 calculates angles and deviations from inertial axes to determine the optimal rigging application of a load 130 engaged by hoist cables 122 of the crane 120.

Turning to FIG. 3, there is illustrated a system 1 including the crane hook sensing device 100, the cabin processor assembly 131 and rigger display device 141.

The crane hook sensing device 100 comprises a microcontroller board 101 which includes a microcontroller 103 that accesses a digital memory 105 that stores firmware 107 containing instructions to calculate the angle 81 of deviation from a vertical axis (or plumb position) of the hook 110 relative to the boom head 124, as well as compensation for any twist of the hook 110. Twisting of the hook 110 typically occurs when a hook block is reeved with an odd number of falls of hoist rope or wind loading and affects the horizontal orientation (yaw) of the hook 110 which will affect the accuracy of calculations of existing systems.

The plumb position is defined by a vertical line 140 (seen in FIG. 2) extending from the ground to the boom head 124.

The microcontroller 103 also operates radio communications Tx/Rx unit 109 to establish radio communications with Tx/Rx unit 98 of between the crane cabin 126 and rigger display 141 using a long range radio technology, such as Low-Power Wide-Area Network (LPWAN) for example.

The crane hook sensing device 100 includes an inertial measurement unit (IMU) 111 in communication with microcontroller 103. The IMU 111 measures the 3-axis orientation of the hook 110 (i.e. pitch, roll and yaw). The IMU 111 includes a gyroscopic sensor 112 (such as an electronic gyroscope) for providing long term orientation data and an accelerometer 113 for providing short term orientation data combined with a Kalman filter (or other suitable statistical estimation filter) to accurately determine the variation from the gravity vector.

A magnetometer 114 of the IMU 111 measures the yaw changes of the hook 110 relative to magnetic north, with calculations in accordance with firmware 107 made to compensate for the heavy iron of the hook 110 which the sensing device 100 is mounted upon.

The hook sensing device 100 is housed within a waterproof housing 121 having a mounting bracket which is removably affixed to the collar 123 of the hook 110 inside the cheekbones 125 of the hook block. Advantageously, the sensing device 100 can be removed from the hook 110 for recharging and maintenance, as required.

The sensing device 100 is powered by a battery 102 located within the housing 121. In some preferable embodiments, the battery 102 is a rechargeable battery that can be recharged using a standard USB charging cable.

Located in the cabin 126 of the crane 120 is a cabin processor assembly 131 connected to the crane sensor bus 133 and coupled to cabin radio Tx/Rx unit 98. The assembly 131 reads lift specific data streams from the existing crane sensors S1, . . . , Sn including the following: load weight, boom radius, boom length and total weight.

The extraction of this data from the crane sensors S1, . . . Sn is make and model dependent and relies on integration technology in the cabin processor assembly 131 that can handle different connections and data formats for different cranes.

A display 135 within the cabin 126 provides the operator 137 with a graphical view of the orientation of the hook in relation to the centre of the load 130 as a bird's eye view of the horizontal plane. The display 135 uses a microprocessor programmed with software to extract the crane data as well as draw the display. Hardware specific to the integration required to extract the crane data is used to connect the display 135 to the existing crane sensors S1, . . . Sn.

The Rigger 139 also has a display assembly 141. The Rigger display assembly 141 includes a radio receiver 142 that receives the data stream sent by the radio Tx/Rx unit 109 of sensing device 100 which includes the real time calculation results that the Rigger 139 can use to adjust the load 130 for optimal lifting. The format of the display 141 can vary, from smart phones to smart glasses, or specifically designed display apparatus that is appropriate for onsite construction use.

The Rigger display 141 provides a graphical plumb gauge that highlights the deviation in degrees (from +10° to −10°) from the vertical as well as other data from the crane sensors S1, . . . Sn like weight and other indications relevant to the Rigger 139.

The radio Tx/Rx unit 109 comprises long range radios for bidirectional communication between the sensing device 100, the radio Tx/Rx unit 98 of the crane cabin 126 and the radio receiving unit 142 of the Rigger display apparatus 141. Suitably, the radio Tx/Rx unit 109 has long range capability to ensure the signal is transferred successfully between the radio Tx/Rx unit 98, the sensing device 100 and the Rigger display apparatus 141 to cater for varying on-site conditions which can adversely affect signal conditions. The system uses a data transfer protocol that is specifically designed to ensure the correct information is received for the crane operator 137 and rigger display apparatus 141 and is resilient to errors in transmission.

As mentioned above, the sensing device 100 measures the deviation in degrees from vertical orientation (indicated by plumb line 140) of the hook 100 underneath the boom 124 which is referred to as "plumb" calibrated to suit by the Rigger 139 at the commencement of lifting. This information is sent via long range radio frequency to a radio Tx/Rx unit 98 in the crane operator's cabin 126 and to a radio Tx/Rx unit assembly 142 of rigger display 141 to display to rigger 139.

In use, the sensing device 100 is attached to the hook 110 of the crane 120. The hook 110 is then attached to the load 130 in preparation for lifting.

Prior to lifting, the sensing device 100 calculates the angle of the pitch plane in real time based on a comparison of the gravity vector measured by the accelerometer of the IMU 111 and compensated by the angular momentum of the gyroscope of the IMU 111 using modified Kalman equations. In addition, due to the accuracy of the angle measurement in the pitch plane decreasing if the hook 110 is twisted, the magnetometer of the IMU 111 (preferably a compass) is used to calculate and compensate for the twist, allowing for high accuracy when calculating the pitch angle for a large number of crane lifting situations. In the event that the hook 110 has deviated beyond a predetermined limit, such as 3° for example, an alert or indication that the hook 110 is currently in an unsafe operating condition can be issued to the operator 137 in the crane cabin 126 by means of display 135 and/or the display device 141 of the Rigger 139 so that the lifting operation may be appropriately adjusted. Alternatively, or additionally, if the hook 110 is within a predetermined range (i.e. not beyond the allowable deviation limit), an alert or indication that the hook is currently in a safe operation condition can be issued to the operator 137 in the crane cabin 126 through alert generator 143 and/or the display device 141 of the Rigger 139.

The alert generator 143 is under the control of cabin processor 131 for producing visual and/or audible signals as instructed by the sensing device 100.

The alert for an unsafe condition can be in the form of a visual element, such as a red flashing light, or an audible signal, such as a siren. Once a safe operating condition has been achieved, the light may change to green, or another colour predetermined to signal a safe condition. Additionally, the audible signal could be a bell chime or other predetermined sound which signifies the safe condition.

An example of the sensing device 100 in use is shown in FIG. 2. The sensing device 100, located adjacent the hook 110 of the crane 120, is measuring the difference in degrees from the plumb position of the hook 110, illustrated by plumb line 140 and deviation line 150.

In the illustrated situation, an alert would be issued to the operator 137 in the cabin 126 of the crane 120 by means of display 135 and/or alert generator 143 and the display device 141 of rigger 139. Upon receiving the alert, the operator 137 and rigger 139 are immediately made aware of an unsafe condition and are able to readily correct the situation by manipulation of the crane controls to achieve a safe operation condition, which can also be detected and indicated by the sensing device.

While the illustration only shows a load with a perfect rigging arrangement (i.e. all lifting equipment having the same length), the sensing device can also be calibrated to allow for an "offset" plumb for situations where a portion of the load has been taken by the crane. This is particularly useful when rigging has different lengths and configurations of both sides of the load.

Advantageously, the sensing device can effectively compute any lateral orientation changes in a hook or hookblock of a crane, such as a specific number of falls of hoist rope in crane configuration or specific rigging applications causing torque, or high winds.

In another advantage, the use of existing crane sensors improves calculations for better guidance to move the jib back or forward.

Another advantage lies in the ability to indicate both safe and unsafe operating conditions of a lifting operation.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step, etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements or steps does not include those elements solely, but may well include other elements not listed.

What is claimed is:

1. A sensing device for a luffing crane for detecting unsafe operating conditions comprising:
- an inertial measurement unit for measuring pitch and yaw of a hook of a crane attached to a load, the inertial measurement unit comprises:
  - an electronic gyroscope;
  - an accelerometer, wherein the gyroscope and the accelerometer are adapted to measure orientation of the hook and obtain orientation data to measure deviation from a plumb position of the hook;
  - a magnetometer adapted to measure yaw of the hook and adapted to measure changes of the hook relative to magnetic north and obtain yaw data, and
  - a microcontroller arranged to:
    - calculate a compensation factor from yaw data measured by the magnetometer;
    - combine the orientation data measured by the gyroscope and the accelerometer with a statistical estimation filter; and
    - determine deviation of the hook of the crane from the plumb position before commencement of lifting the load attached to the hook using the combination of the orientation data with the statistical estimation filter and the compensation factor,
  - wherein the inertial measurement unit is adapted to activate an alert element if the deviation of the hook exceeds a predetermined limit.

2. A sensing device according to claim 1, wherein the sensing device is adapted to activate an alert element if the deviation of the hook is within a predefined range.

3. A sensing device according to claim 2, wherein the alert element is an audible signal generator or a visual signal generator.

4. A sensing device according to claim 1, wherein the sensing device is adapted to indicate a plumb or an out of plumb lift cable attached to a load.

5. A sensing device according to claim 1, wherein the sensing device comprises a waterproof housing and the inertial measurement unit is located within the housing.

6. A sensing device according to claim 1, wherein the inertial measurement unit is adapted to measure the deviation of the hook in degrees.

7. A sensing device according to claim 1, wherein the sensing device is wirelessly connected to a graphical display device.

8. A sensing device according to claim 7, wherein the sensing device is arranged to operate the graphical display device to display a visual indication of the hook in relation to the plumb position on the graphical display device.

9. A sensing device according to claim 1, wherein the sensing device is connected to a crane sensor bus and the sensing device is arranged to read one or more of a load weight, a boom radius, a boom length and a total weight from the crane sensor bus.

10. A method for detecting an unsafe operating lifting condition for a luffing crane, the method comprising the steps of:
- measuring orientation of a hook of a crane attached to a load from an electronic gyroscope and an accelerometer of an inertial measurement unit attached to the hook of the crane;
- obtaining orientation data from the electronic gyroscope and the accelerometer of the inertial measurement unit;
- measuring yaw of the hook from a magnetometer of the inertial measurement unit;
- obtaining yaw data from the magnetometer of the inertial measurement unit;
- calculating, using a microcontroller, a compensation factor from the yaw data measured by the magnetometer;
- combining, using the microcontroller, the orientation data measured by the accelerometer and the electronic gyroscope with a statistical estimation filter;
- determining a deviation of the hook from a plumb position before commencement of lifting the load attached to the hook using the combination of the orientation data with the statistical estimation filter and the compensation factor; and
- activating an alert element if the hook is not in a plumb position.

11. A method according to claim 10 further comprising the step of determining if the deviation of the hook from the plumb position is less than or greater than a predetermined limit.

12. A method according to claim 10 wherein the step of measuring orientation of the hook further comprises calculating an angle of pitch of the hook using the inertial measurement unit.

13. A method according to claim 12, wherein the step of measuring yaw of the hook further comprises calculating the angle of yaw of the hook using the inertial measurement unit.

14. A method according to claim 12, wherein if the deviation of the hook is greater than a predetermined limit, the method comprises the further step of operating the alert element to indicate that the deviation of the hook is greater than the predetermined limit.

15. A method according to claim 12, wherein if the deviation of the hook is less than the predetermined limit, the method comprises the further step of operating an alert element to indicate that the deviation of the hook is less than the predetermined limit.

16. A method according to claim 12, wherein the step of calculating the angle of pitch comprises comparing the orientation data obtained from the electronic gyroscope and the accelerometer with a gravity vector.

17. A method according to claim 16, wherein the orientation data from the gyroscope comprises the angular momentum of the hook.

18. A method according to claim 10, the method comprising the further step of determining if the hook is in a plumb or out of plumb position.

19. A method according to claim 10, wherein the alert element comprises a display device associated with an operator of the crane and/or a rigger.

20. A method according to claim 10, wherein the magnetometer compensates for any twist in the cables attached to the hook.

* * * * *